United States Patent Office 3,758,470
Patented Sept. 11, 1973

3,758,470
TRIAZINYL-ANTHRAQUINONES
Hans Ackermann, Bottmingen, Herbert Seiler, Riehen, and Paul Dussy, Basel, Switzerland, assignors to Ciba-Geigy AG, Basel, Switzerland
No Drawing. Filed Oct. 16, 1970, Ser. No. 81,598
Claims priority, application Switzerland, Oct. 17, 1969, 15,581/69
Int. Cl. C07d 55/20
U.S. Cl. 260—249         2 Claims

ABSTRACT OF THE DISCLOSURE

New fibre reactive azo, anthraquinone, formazane and phthalocyanine dyestuffs are described which possess as fibre reactive moiety a cyanamide-triazinyl grouping of the formula

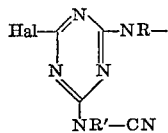

wherein R and R' represent hydrogen or lower alkyl, bound via the —NR-grouping to a ring carbon atom of the aforesaid dyestuff.

---

These dyes are suitable for the dyeing or printing of organic material, especially textile material made from natural and regenerated cellulose or that made from natural or synthetic polyamides as well as mixed fabric made from cellulose/polyester or polyamide/polyester. The dyeings have pure and deeply coloured shades, good fastness to wet processing and are distinguished by a high-resistance to acid agents.

The present invention relates to new, valuable reactive dyestuffs, to processes for their production, to their use for the dyeing or printing of organic material, especially textile material made from natural and regenerated cellulose or from natural and synthetic polyamides, as well as, as an industrial product, to the organic material dyed or printed using these new reactive dyestuffs.

New reactive dyestuffs have been found corresponding to Formula I:

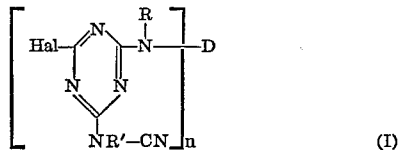

wherein
D represents the radical of an organic dyestuff,
R and R' represent, independently of each other, hydrogen or lower alkyl, each preferably, however, representing hydrogen,
Hal represents fluorine, chlorine or bromine, and
n represents the number 1 or 2.

These new reactive dyestuffs are characterised in that they form with textile fibres containing hydroxyl and amino groups covalent bonds, and that they possess better water-solubility and stability than the nearest comparable reactive dyestuffs hitherto known.

In the above formula wherein Hal represents fluorine, chlorine or bromine, preferably chlorine, and R and R' represent hydrogen or a lower alkyl group, e.g. the methyl or ethyl group, D represents the radical of an organic dyestuff, particularly the radical of a technically easily accessible dyestuff, e.g. the radical of an optionally heavy-metal-containing azo dyestuff, a formazan dyestuff, an anthraquinone or a phthalocyanine dyestuff.

If D is the radical of an azo dyestuff, then it is, e.g. the radical of a metal-free or metal-containing mono- or disazo dyestuff in which a metal atom can be coordinately linked either to one dyestuff molecule or to two dyestuff molecules. In the latter case, the dyestuffs are known as 1:2-metal complex dyestuffs.

The monoazo dyestuffs are, e.g. of the class: benzene-azo-benzene, benzene-azo-naphthalene, benzene-azo-pyrazole, benzene - azo-acetoacetylarylide, naphthalene-azo-naphthalene and naphthalene-azo-pyrazole, whilst the disazo dyestuffs are of the class: benzene-azo-benzene-azo-benzene, benzene-azo-naphthalene-azo-benzene, naphthalene-azo-benzene-azo-benzene and benzene-azo-benzene-azo-pyrazole.

If D is the radical of an anthraquinone dyestuff, then those concerned are preferably 1-amino-4-phenylamino-, -4 - diphenylamino- or -4-dibenzenedisulphimido-anthraquinone radicals.

If D represents the radical of a phthalocyanine dyestuff, then it is preferably the radical of an, in particular, sulphonated phthalocyaninesulphonic acid alkylamide or -arylamide.

If D denotes the radical of a formazan dyestuff, then the dyestuffs concerned are, e.g. di- or tricyclic metal-containing formazan dyestuffs, or also formazanazo dyestuffs.

The mentioned dyestuffs of Formula I may contain, in addition to the characteristic

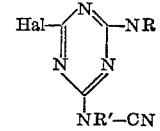

in the dyestuff radical D, the substituents usual in dyestuffs, especially in reactive dyestuffs. Such substituents are, in the first place: halogen atoms such as fluorine, chlorine and bromine; lower alkyl groups such as the methyl, ethyl or propyl groups; ether groups such as the methoxy, ethoxy, benzyloxy or phenoxy groups; N-mono- or N,N-disubstituted amino groups; acylamino groups such as the acetylamino and benzoylamino groups; the nitro and hydroxyl groups, as well as, in particular, water-solubilising groups such as disulphimide groups and, in particular, the sulphonic acid group and carboxyl group.

The organic dyestuffs of the initially stated Formula I contain the grouping

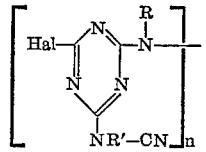

either on the dyestuff structure direct, or on external substituents, in the latter case perhaps on the benzene ring of benzoylamino or phenylamino grups, or on ω-carbon atoms of lower alkylamino or alkylaminosulphonyl substituents, or also in external cyclohexylamino groups.

These new reactive dyestuffs are in the form of coloured powders, the colur of which extends, as a function of the chromophoric system and the auxochromes present, through the whole spectrum, and which, in the form of their alkali salts, are readily soluble in water, in some cases already at ca. 20° C.

These dyestuffs are suitable for the dyeing or printing of organic material, especially textile material made from natural and regenerated cellulose such as staple fibre, jute, ramie, hemp and, in particular, cotton, or that made from synthetic polyamides such as nylon, Perlon or Banlon, or natural polyamides such as silk, or especially wool, and also chlorinated wool, as well as mixed fabric made from cellulose polyester or polyamide polyester material, whereby the polyester part remains reserved by these dyestuffs and, optionally, may be dyed or printed with a dispersion dyestuff either simultaneously or separately.

These materials are dyed or printed with the reactive dyestuffs according to the invention by methods usual for these substrates. Suitable textile materials are, e.g. fibres, threads, yarns or knitted goods.

The cellulose material is impregnated or printed at low temperature, e.g. at 20–50° C., with the optionally thickened dyestuff solution, and the dyestuff then fixed by treatment with acid-binding agents. Suitable acid-binding agents are, e.g. sodium carbonate, potassium carbonate, di- and trisodium phosphate, sodium hydroxide, and, at temperatures above 50° C., also potassium or sodium bicarbonates. Instead of subjecting the impregnated materials to an alkaline after-treatment, it is also possible in many cases to add the acid-binding agent, preferably in the form of alkali carbonates, directly to the impregnating liquors or printing pastes, and then to effect the development of the dyeing by a short heating or steaming to temperatures of ca. 100° C. to 160° C., or advantageously by prolonged standing at room temperature. The addition of hydrotropic agents to the impregnating liquors and printing pastes is advantageous in this process, e.g. the addition of urea in amounts of 10 to 200 g. per litre of dyestuff.

Furthermore, the cellulose material may be dyed with the reactive dyestuffs according to the invention also by the exhaust process, whereby the cellulose material to be dyed is introduced into the dye bath containing an acid-binding agent and, optionally, also neutral salts such as, e.g. sodium chloride or sodium sulphate, the bath containing a long liquor, i.e. with a ratio of goods to liquor of about 1:10 to 1:50, at slightly elevated temperature; the dye bath is then heated to temperatures of 40, 60 or up to 100° C., and the dyeing process is completed at this temperature. The neutral salts accelerating absorption of the dyestuffs may be added to the bath, optionally, also after attainment of the actual dyeing temperature.

By the treatment with acid-binding agents, the new reactive dyestuffs are bound covalently to the fibres. The thus obtained cellulose dyeings are then advantageously soaped to remove non-fixed dyestuff.

Non-fixed dyestuff can be very easily washed out completely, which constitutes one of the most essential requirements for good fastness to wet processing in the case of the cellulose dyeings produced with reactive dyestuffs.

Natural and synthetic polyamide fibres are dyed in a hot bath, and in many cases from a neutral to weakly acid bath, e.g. from an acetic acid bath. It is frequently advisable to add compounds containing basic nitrogen, such as fatty acid alkanolamine ethylene oxide condensation products, or polyquaternary ammonium compounds, as well as salts such as sodium chloride or sodium sulphate. The polyamide dyeings are advantageously given an aftertreatment with mineral-acid-binding agents such as ammonia, disodium phosphate, sodium bicarbonate, or hexamethylenetetramine.

The printing paste required for the printing of cellulose materials is obtained, e.g. by stirring together, at room temperature, urea, an oxidising agent, e.g. the sodium salt of m-nitrobenzenesulphonic acid, a thickening agent such as sodium alignate, and an alkali such as sodium bicarbonate, with water, to form a stock thickening; and then stirring the reactive dyestuff into this thickening.

The reactive dyestuffs thus applied by the printing paste are fixed, preferably continuously, in the usual manner, e.g. by a dry heat treatment at 100–180° C., by steaming, especially with saturated steam at 100–105° C. at atmospheric pressure, or with superheated steam at above 100° C. at atmospheric pressure or at a slight excess pressure, preferably at 102–140° C.

To complete the printings, it suffices, as a rule, to rinse cold and hot, to soap them for a short time at boiling temperature, to rinse again and then dry.

The thus obtained cellulose and polyamide dyeings or printings are pure and deeply coloured, they have a good fastness to wet processing, and are distinguished, in particular, by a high resistance to acid agents.

Furthermore, the shade and also fastness to light of the obtained cellulose dyeings and printings are only negligibly affected during the aftertreatment with agents for improving the resistance to creasing. Especially in the assessment of their overall properties are the obtained cellulose dyeings and printings superior to the nearest comparable known reactive dyestuffs.

These new reactive dyestuffs are obtained by various process. One process consists in reacting 1 mole of an organic dyestuff of Formula II:

wherein

D represents the radical of an organic dyestuff,
R represents hydrogen or a lower alkyl group, and
$n$ represents the number 1 or 2, with $n$ moles of a triazine compound of Formula III:

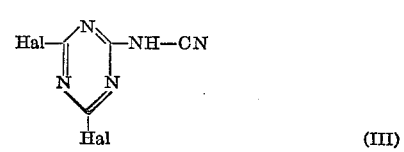

wherein Hal represents fluorine, chlorine or bromine, to give a reactive dyestuffs of Formula Ia:

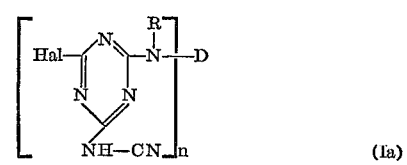

wherein D, R, $n$ and Hal have the meanings given under Formulae II and III; or in building up the dyestuff of Formula Ia from components of dyestuffs D, of which components at least one contains the radical of Formula

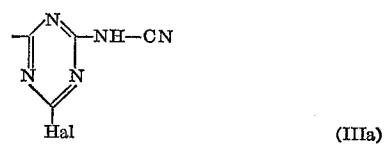

bound by way of the amino group —NR—; and, optionally, alkylating in the final dyestuff of Formula Ia the nitrogen of the cyanamide group with an alkylating agent.

The dyestuffs of Formula II containing amino groups, usable as starting dyestuffs, preferably those wherein R represents hydrogen, are, e.g. aminoanthraquinones such as, e.g. 1-amino-4 (m- or p-aminophenylamino)-anthraquinones and their sulphonic acids; aminophthalocyanines such as condensation products of phthalocyaninesulphonic acid chloride with alkylenediamines or with optionally sulphonated phenylenediamines, as well as aminoformazan dyestuffs and aminoazo dyestuffs. The last-named contain amino groups to be acylated, in the coupling component and/or in the diazo component.

The starting dyestuffs of Formula II containing NHR-groups are obtained using production processes known to the expert.

The compounds usable according to the invention, of Formula III

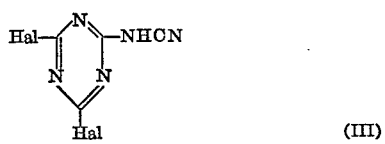

(III)

which are new and which introduce into the end dyestuffs of Formula I the radical of Formula IIIa, are obtained, e.g. by the reaction of 2,4,6-trichlorotriazine, 2,4,6-tribromotriazine, or also 2,4,6-trifluorotriazine, with at least 1 mole of cyanamide; it is advantageous thereby to use the alkali salt, especially the sodium salt, in aqueous solution at a temperature of ca. 0–10°. The preferred 2,4-dichlorotriazine-6-cyanamide is thereby obtained as colourless solid sodium salt, which can be isolated by salting out.

The reaction of the amino dyestuffs of Formula II with compounds of Formula III is performed in the usual manner, advantageously in aqueous medium, optionally in the presence of inert, easily removable organic solvents such as lower aliphatic ketones, e.g. acetone, and preferably in the presence of mineral-acid-buffering agents such as sodium or potassium carbonate, sodium or potassium hydroxide, di- or trisodium or di- or tripotassium phosphate, or sodium or potassium acetate, at temperatures of about 40 to 60° C.

After completion of the reaction, the finished reactive dyestuff of Formula Ia is salted out from its preferably pre-neutralised solution or suspension using sodium chloride or potassium chloride, filtered off under suction, washed and dried. The new dyestuffs are advantageously dried with a moderate heat and, optionally, under reduced pressure.

On the other hand, the dyestuffs of Formula Ia are also obtained by buildup from components D, which components contain at least one radical of Formula IIIa bound by way of the amino group —NR—. This procedure is especially suitable for the production of azo dyestuffs by coupling of an aromatic diazonium compound with a coupling component, of which at least one contains the characteristic group according to the invention of Formula IIIa.

For example, a diazonium compound of an amine of Formula IV:

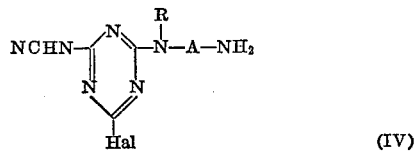

(IV)

wherein

A represents an optionally further substituted radical of an aromatic diazo component, and
R and Hal have the meanings given under Formula I, is coupled with a coupling component B—H to give an azo dyestuff of Formula V:

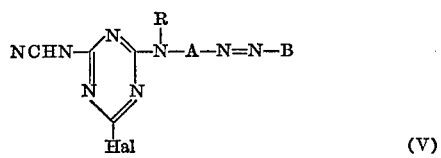

(V)

If in the radicals A and B there are in o-position to the azo group metallisable substituents such as, e.g. a hydroxy or carboxyl group, then, optionally, the thus obtained metallisable azo dyestuffs can be further reacted with metal-introducing agents to metal-containing azo dyestuffs.

Another variation of this process consists in coupling a diazonium compound of an amine of the Formula A—NH₂ with a coupling component of Formula VI:

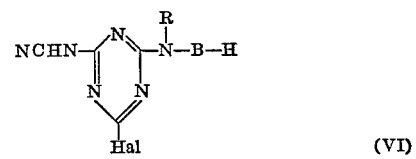

(VI)

wherein

R and Hal have the meanings given under Formula Ia, and
B represents the radical of a coupling component, to give a dyestuff of Formula VII:

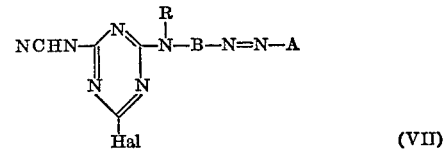

(VII)

and, optionally, converting the obtained dyestuff, provided that it contains in A and B in o-position to the azo bridge metallisable substituents such as the hydroxyl group or the carboxyl group, with metal-releasing agents into the corresponding metal complex dyestuff.

Applicable as the diazonium compound for this purpose are diazotised aromatic amines common in azo dyestuffs, e.g. optionally sulphonated phenyl- or naphthyldiazonium compounds.

Coupling components are, e.g. aminonaphtholsulphonic acids or aminoacrylpyrazolones or -pyrazolimines, as well as acetoacetylaminoarylides.

Azo dyestuffs having two triazinyl groups of Formula IIIa are, amongst other ways, also obtained by coupling of a diazonium compound of Formula IV with a coupling component of Formula VI.

The coupling is performed, in the usual manner, in weakly acid to weakly alkaline medium.

Both the coupling and, optionally, also metallisation with metal-releasing agents such as copper salts, chromium salts, nickel salts or cobalt salts, must be carried out under carefully regulated conditions, i.e. with the avoidance of high pH-values and temperatures.

Metal complex dyestuffs thus obtained can then be reacted with one mole of a further metallisable azo dyestuff to give 2:1-complex dyestuffs.

A modified embodiment for the production of these reactive dyestuffs of Formula I consists in condensing a dyestuff containing triazinyl groups, of Formula VIII:

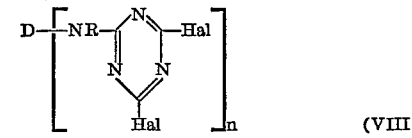

(VIII)

wherein D, R, Hal and $n$ denote that stated in Formula Ia, with at least $n$ moles of cyanamide or, advantageously, of its alkali salt such as sodium salt, to give a reactive dyestuff of Formula Ia; and, optionally, alkylating the nitrogen of the cyanamide group with an alkylating agent.

The starting materials of Formula VIII are obtained, e.g. by reacting, in the usual manner, a dyestuff of Formula II containing amino groups with 2,4,6-tri-chloro-, -bromo-, or -fluoro-1,3,5-triazine.

The reaction of the dyestuff of Formula VIII containing triazinyl groups with cyanamide or with its alkali salt, preferably the sodium salt, is performed at a temperature of 40°–60° C. in aqueous medium.

After completion of the reaction, the finished reactive dyestuff of Formula Ia is salted out, filtered off under suction, washed and dried, as described in the first process.

In the thus obtained dyestuffs of Formula Ia, the nitrogen of the cyanamide group can, if so desired, be alkylated by reacting the dyestuffs of Formula Ia with, advantageously, an excess of alkylating agents such as, e.g. dimethyl sulphate or diethyl sulphate at temperatures of 40–55° C. in aqueous medium.

In this way, the reactive dyestuffs of Formula I, wherein R' represents lower alkyl are obtained.

The following non-limitative examples serve to illustrate the invention. The temperatures are given in degrees centigrade, and the ratio of parts by weight to parts by volume is as g. to cm.³.

EXAMPLE 1

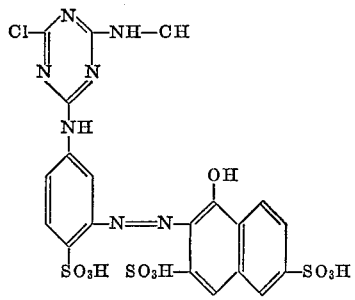

An amount of 20 g. of 2,4-dichloro-6-cyanamide-1,3,5-triazine is added to a solution of 50.3 g. of the monoazo dyestuff produced from diazotised 1,3-diaminobenzene-4-sulphonic acid coupled to 1-hydroxy-naphthalene-3,6-disulphonic acid, in 1000 ml. of water at about 45–55°. The pH-value is maintained at ca. 7.0 to 7.5 by the addition of soda solution, and stirring proceeds for ca. 5 hours at a temperature of 45–50°. As soon as the condensation reaction is finished, the formed reactive dyestuff of the above formula is precipitated with potassium chloride, filtered off, washed with dilute potassium chloride solution, and dried in vacuo at 80–85°.

The reactive dyestuff is in the form of a red powder which dissolves in water to give an orange-red colour.

The 2,4-dichloro-6-cyanamide-1,3,5-triazine used as starting product is obtained by suspending 37 g. of cyanuric chloride in a mixture of 200 g. of ice and 20 g. of acetone, whilst vigorous stirring is maintained; and then adding dropwise at 0°, so that the pH-value is held between 9.0 and 10.0, a solution of 17.2 g. of disodium cyanamide in 100 ml. of water. After the dropwise addition, stirring is continued for about 12 hours at 0–5° and the formed suspension is dissolved by the addition of water. By the addition of sodium chloride, 2,4-dichloro-6-cyanamide-1,3,5-triazine is precipitated; it is then filtered off and washed.

Reactive dyestuffs having similar properties are obtained by condensing the dyestuffs containing amino groups listed in column II of the following Table 1 with the triazine compounds given in column III, as described in Example 1. The shades of the dyeings on cotton with the obtained reactive dyestuffs are shown in column IV of the same table.

TABLE 1

| I | II | III | IV |
|---|---|---|---|
| Ex. No. | Dyestuff | Triazine compound | Shade on cotton |
| 2 | H₂N—⌬—SO₃H, N=N—pyrazole(CH₃, HO)—phenyl(Cl, SO₃H) | Cl—triazine—NHCN, Cl | Yellow. |
| 3 | H₂N—⌬—SO₃H, N=N—pyrazole(CH₃, HO)—phenyl(SO₃H, SO₃H) | Same as above | Greenish yellow. |
| 4 | H₂N—⌬—SO₃H, N=N—pyrazole(CH₃, HO)—naphthyl(SO₃H, SO₃H) | F—triazine—NHCN, F | Yellow. |

TABLE 1—Continued

| Ex. No. | Dyestuff | Triazine compound | Shade on cotton |
|---|---|---|---|
| 5 | $H_2N$—C$_6$H$_3$(SO$_3$H)—N=N—C(COOH)=C(OH)—N(—C$_6$H$_4$—SO$_3$H)—N (pyrazolone) | 4,6-dichloro-2-(NHCN)-triazine | Yellow. |
| 6 | $H_2N$—C$_6$H$_3$(SO$_3$H)—N=N—C(CH$_3$)=C(OH)—N(—C$_6$H$_4$—SO$_3$H)—N (pyrazolone) | Same as above | Do. |
| 7 | $H_2N$—C$_6$H$_3$(SO$_3$H)—N=N—C(COOH)=C(OH)—N(—C$_6$H$_4$—SO$_3$H)—N (pyrazolone) | 4,6-dibromo-2-(NHCN)-triazine | Reddish yellow. |
| 8 | $NH_2$—C$_6$H$_3$(SO$_3$H)—N=N—C(CH$_3$)=C(NH$_2$)—N(—C$_6$H$_4$—SO$_3$H)—N (pyrazole) | Same as above | Yellow. |
| 9 | $HO_3S$—C$_6$H$_3$(COOH)—N=N—C(CH$_3$)=C(OH)—N(—C$_6$H$_3$(SO$_3$H)(NH$_2$))—N (pyrazolone) | 4,6-dichloro-2-(NHCN)-triazine | Do. |
| 10 | $C_2H_5O$—C$_6$H$_3$(SO$_3$H)—N=N—C(CH$_3$)=C(OH)—N(—C$_6$H$_3$(SO$_3$H)(NH$_2$))—N (pyrazolone) | Same as above | Do. |
| 11 | 1,8-disulfonaphthyl—N=N—C$_6$H$_3$(CH$_3$)(NH$_2$) | ...do... | Do. |
| 12 | $HO_3S$-naphthyl-SO$_3$H—N=N—C$_6$H$_4$—NH$_2$ | 4,6-dibromo-2-(NHCN)-triazine | Do. |
| 13 | 1,8-disulfonaphthyl—N=N—C$_6$H$_2$(CH$_3$)(OCH$_3$)(NH$_2$) | 4,6-dichloro-2-(NHCN)-triazine | Do. |

TABLE 1—Continued
| Ex. No. | Dyestuff | Triazine compound | Shade on cotton |
|---|---|---|---|
| 14 | 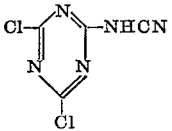 | 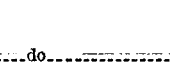 | Yellow. |
| 15 |  | ......do............... | Do. |
| 16 | 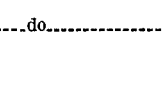 | ......do............... | Bluish red. |
| 17 | 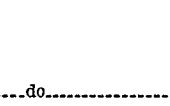 | ......do............... | Red. |
| 18 |  | ......do............... | Bluish red. |
| 19 | 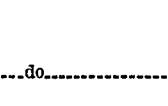 | ......do............... | Orange. |
| 20 | 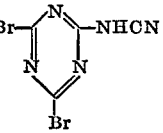 | 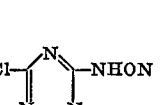 | Reddish orange. |
| 21 | 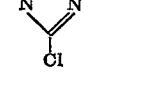 | Cl—⟨triazine⟩—NHON, Cl | Scarlet. |
| 22 | (structure) | Same as above......... | Reddish orange. |

TABLE 1—Continued

| Ex. No. | Dyestuff | Triazine compound | Shade on cotton |
|---|---|---|---|
| 23 | (structure: benzene with SO₃H, SO₃H substituents, azo-linked to naphthalene with OH, SO₃H, NH₂) | Cl-triazine-NHON / Cl | Orange. |
| 24 | (structure: naphthalene with SO₃H, SO₃H, azo-linked to naphthalene with OH, SO₃H, NH–CH₃) | ...do... | Reddish orange. |
| 25 | (structure: benzene with SO₃H, SO₃H, azo-linked to naphthalene with OH, NH–CO–phenyl-NH₂, SO₃H) | ...do... | Bluish red. |
| 26 | (structure: benzene with SO₃H, SO₃H, azo-linked to naphthalene with SO₃H, azo-linked to phenyl-NH₂) | ...do... | Orange. |
| 27 | (structure: H₂N-phenyl(CH₃)-azo-phenyl(SO₃H)-azo-pyrazolone with CH₃, HO, N–phenyl(SO₃H, SO₃H)) | ...do... | Yellow. |
| 28 | (structure: naphthalene with SO₃H, SO₃H, SO₃H, azo-linked to phenyl(CH₃)-azo-phenyl-NH₂) | ...do... | Orange. |
| 29 | (structure: phenyl(SO₃H)-azo-phenyl(SO₃H)-azo-phenyl(CH₃)-NH₂) | ...do... | Do. |
| 30 | (structure: HO₃S-phenyl(SO₃H)-azo-naphthalene(NH₂, OH, SO₃H)-azo-phenyl(SO₃H, NH₂)) | ...do... | Blue-black. |
| 31 | (structure: Cu complex with HO₃S-phenyl-azo-naphthalene(SO₃H, NH₂), SO₃H) | ...do... | Ruby. |

TABLE 1—Continued

| Ex. No. | Dyestuff | Triazine compound | Shade on cotton |
|---|---|---|---|
| 32 | Cu complex of 4-chloro-2-aminophenol-5-sulfonic acid → 1-amino-8-hydroxy-naphthalene-3,6-disulfonic acid with NH-CH₂-CH₂-NH₂ substituent (structure shown) | Cl-triazine-NHON with Cl (structure shown) | Ruby. |
| 33 | Cu complex azo dye (structure with HO₃S, SO₃H, NH₂, SO₃H groups) | ...do... | Violet. |
| 34 | Cu complex azo dye (structure with SO₃H, NH₂ groups) | ...do... | Claret shade. |
| 35 | Cu complex azo dye (structure with H₂N, SO₃H, SO₃H groups) | ...do... | Ruby. |
| 36 | Cu complex with pyrazolone (HO₃S, NH₂, CH₃, SO₃H groups) | ...do... | Yellow brown. |
| 37 | Cu complex azo dye (HO₃S, NH₂, NH₂, SO₃H, SO₃H groups) | ...do... | Reddish navy blue. |
| 38 | Cu complex azo dye (HO₃S, NH-phenyl, NH₂, SO₃H, SO₃H groups) | ...do... | Navy blue. |
| 39 | Cu complex azo dye (H₂N, NH₂, SO₃H, SO₃H groups) | ...do... | Blue. |

TABLE 1—Continued

| Ex. No. | Dyhstuff | Trizaine compound | Shade on cotton |
|---|---|---|---|
| 40 | [Cu complex azo dye with HO₃S-phenyl-N=N-naphthyl(SO₃H)(NH-CH₃) structure] | 2,6-dichloro-4-(NHON)-triazine | Ruby. |
| 41 | [Cu complex disazo dye with SO₃H, OCH₃, SO₃H, NH₂, SO₃H substituents] | ...do... | Navy blue. |
| 42 | [Co complex bis-azo dye with O₂N, HO₃S, SO₃H, NH₂, NO₂ substituents] | 2,6-dibromo-4-(NHCN)-triazine | Black brown. |
| 43 | [Cr complex bis-azo dye with HO₃S, SO₃H, NH₂, O₂N substituents] | 2,6-dichloro-4-(NHCN)-triazine | Black. |
| 44 | [Cr complex bis-azo dye with NO₂, SO₃H, NH₂ substituents] | Same as above | Do. |
| 45 | O₂N-phenyl(SO₃H)-CH=CH-phenyl(SO₃H)-N=N-phenyl-NH₂ | ...do... | Greenish yellow. |

TABLE 1—Continued

| I | II | III | IV |
|---|---|---|---|
| Ex. No. | Dyestuff | Triazine compound | Shade on cotton |
| 45a | 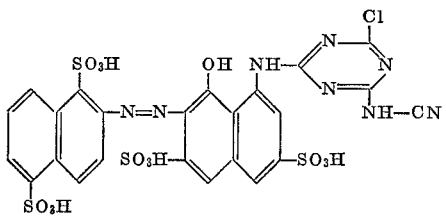 | 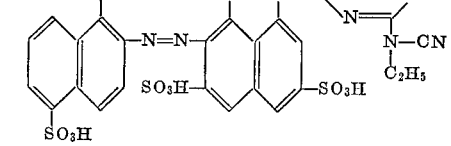 | Red. |
| 45b | 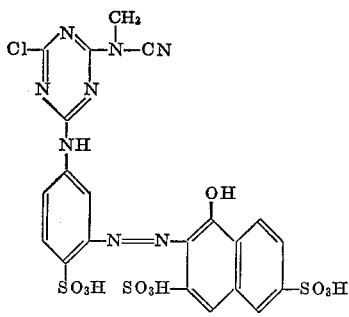 | ......do.................. | Yellow. |

EXAMPLE 46

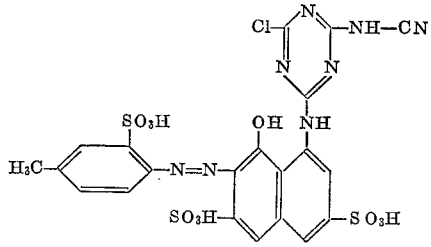

A solution of 20.3 g. of cyanuric chloride in 120 ml. of acetone is added dropwise to 100 ml. of water at 0°. To the obtained finely dispersed dispersion is added dropwise within 1 hour a solution of 63.3 g. of the dyestuff obtained from diazotised 2-naphthylamine-1,5-disulphonic acid coupled with 1-amino-8-hydroxynaphthalene-3,6-disulphonic acid, in 700 ml. of water at 0°; the pH-value is maintained between 6 and 7 by the addition of soda solution, and the solution is stirred for ca. 12 hours at 0–5°. The dyestuff solution is subsequently heated to 40–45°, and to it is added dropwise at this temperature, within 30 minutes, a solution of 9.5 g. of disodium cyanamide in 50 ml. of water. The dyestuff is afterwards salted out with sodium chloride, filtered off, washed with dilute sodium chloride solution, and then dried in vacuo.

The dyestuff of the above formula is in the form of a red powder which dissolves in water to give a bluish red colour.

EXAMPLE 47

An amount of 15.7 g. of the dyestuff produced according to Example 1 is dissolved in 1000 ml. of water; to the solution are then added dropwise at 40–50°, within 1 hour, 100 g. of dimethyl sulphate, the pH-value being thereby maintained between 6 and 7 by the addition of soda solution. The methylated dyestuff of the above formula is precipitated by the addition of sodium chloride, filtered off, washed with dilute sodium chloride solution, and dried in vacuo.

The dyestuff is in the form of a red powder which dissolves in water to give an orange-red colour.

EXAMPLE 48

An amount of 78.6 g. of the dyestuff obtained according to Example 46 is dissolved in 1100 ml. of water; to the obtained solution are added at 40–50°, within 1 hour, 120 g. of diethyl sulphate, the pH-value being thereby maintained between 6 and 7 by the dropwise addition of an aqueous trisodium phosphate solution. The ethylated dyestuff of the above formula is precipitated by addition of sodium chloride, filtered off, washed with diluted sodium chloride solution, and dried in vacuo.

The dyestuff is in the form of a red powder which dissolves in water to give a bluish red colour.

EXAMPLE 49

An amount of 31.9 g. of 1-amino-8-hydroxynaphthalene-3,6-disulphonic acid is dissolved at 35–40° in 200 parts of water with sodium hydroxide solution, with a pH-value of 6.5. The solution is then adjusted to a pH-value of 4; to the solution are added 20 g. of 2,4-dichloro-6-cyanamido-1,3,5-triazine, and the pH-value of the reaction mixture is thereby maintained at 3 by the addition of sodium carbonate solution. After completed condensation, 30 g. of sodium bicarbonate are added to the solution, and a solution of 18.7 g. of diazotised 1-amino-4-methylbenzene-2-sulphonic acid is then added. As soon as the coupling is finished, sodium chloride is added to the reaction mixture, the precipitated dyestuff filtered off, and washed with sodium chloride solution. After drying in vacuo, a red powder is obtained which readily dissolves in water to give a red colour.

If cotton or staple fibre is dyed or printed with this dyestuff by the usual processes for reactive dyestuffs, then red dyeings or printings are obtained having very good fastness properties.

EXAMPLE 50

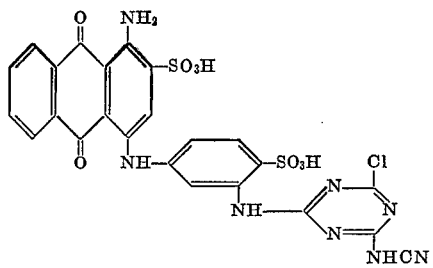

A solution of 20.3 g. of cyanuric chloride in 100 ml. of acetone is added dropwise at 0° into 100 ml. of water. To the thus obtained finely dispersed dispersion is added dropwise within 1 hour, with stirring, a solution of 48.9 g. of 1-amino-4-(3'-amino-4'-sulphophenylamino)-anthraquinone-2-sulphonic acid in 300 ml. of water at 0°; and the pH-value is held between 6 and 7 by the addition of soda solution. Stirring then proceeds at 0–5° for ca. 12 hours. The dyestuff suspension is subsequently heated to 40–50°, to it is then added dropwise within 2 hours a solution of 9.5 g. of disodium cyanamide in 50 ml. of water; the anthraquinone dyestuff of the above formula is subsequently salted out with potassium chloride, filtered off, washed with potassium chloride solution, and dried in vacuo.

The dyestuff is in the form of a blue powder which dissolves in water to give a blue colour.

If, instead of the 48.9 g. of 1-amino-4-(3'-amino-4'-sulphophenylamino)-anthraquinone - 2 - sulphonic acid mentioned in this example, equivalent amounts of the anthraquinone compounds listed in Column II of the following Table 2 are used, with the procedure being otherwise as stated in Example 50, then dyestuffs are obtained having similar properties. The shades of the cellulose dyeings produced with the final products are given in column III of the same table.

TABLE 2

| I Example number | II Anthraquinone compound | III Shade on cellulose |
|---|---|---|
| 51 | [structure] | Blue. |
| 52 | [structure] | Do. |
| 53 | [structure] | Greenish blue. |
| 54 | [structure] | Blue. |

TABLE 2—Continued

| I | II | III |
|---|---|---|
| Example number | Anthraquinone compound | Shade on cellulose |
| 55 | [structure: 1-NH2, 2-SO3H, 7-SO3H, 4-NH-C6H3(SO3H)(NH2) anthraquinone] | Blue. |
| 56 | [structure: 1-NH2, 2-SO3H, 7-SO3H, 4-NH-biphenyl-NH2(SO3H) anthraquinone] | Do. |
| 57 | [structure: 1-NH2, 2-SO3H, 4-NH-C6H3(SO3H)(NH2) anthraquinone] | Do. |
| 58 | [structure: 1-NH2, 2-SO3H, 7-SO3H, 4-NH-C6H3(SO3H)(NH2) anthraquinone] | Do. |
| 59 | [structure: 1-NH2, 2-SO3H, 4-NH-C6H4-NH2 anthraquinone] | Greenish blue. |
| 60 | [structure: 1-NH2, 2-SO3H, 8-SO3H, 4-NH-C6H4-NH2 anthraquinone] | Do. |
| 61 | [structure: 1-NH2, 2-SO3H, 7-SO3H, 4-NH-C6H4-NH2 anthraquinone] | Do. |
| 62 | [structure: 1-NH2, 2-SO3H, 7-SO3H, 4-NH-C6H4-NH2 anthraquinone] | Do. |

TABLE 2—Continued

| I Example number | II Anthraquinone compound | III Shade on cellulose |
|---|---|---|
| 63 | (anthraquinone structure) | Greenish blue. |
| 64 | (anthraquinone structure) | Do. |
| 65 | (anthraquinone structure) | Blue. |
| 66 | (anthraquinone structure) | Greenish blue. |
| 67 | (anthraquinone structure) | Do. |
| 68 | (anthraquinone structure) | Blue. |
| 69 | (anthraquinone structure) | Greenish blue. |

TABLE 2—Continued

| I Example number | II Anthraquinone compound | III Shade on cellulose |
|---|---|---|
| 70 | (structure: 1-amino-4-[(aminophenyl)sulfonyl-amino]-anthraquinone-disulfonic acid derivative with $SO_3H$, $HO_3S$, $NH_2$ groups) | Greenish blue. |
| | After-sulphonated: | |
| 71 | (structure with $HO_3S$, $NH_2$, $SO_3H$, $NH$—phenyl(H)—$NH_2$) | Blue. |
| 72 | (structure with $NH_2$, $SO_3H$, $NH$—phenyl($SO_3H$)—CH=CH—phenyl($SO_3H$)—$NH_2$) | Do. |
| 73 | (structure with $NH_2$, $SO_3H$, $NH$—xylyl($CH_3$, $CH_3$)—$SO_2$—$NH_2$) | Reddish blue. |
| 74 | (structure with $HO_3S$, $NH_2$, $SO_3H$, $NH$—phenyl—$CH_2$—$NH_2$) | Greenish blue. |
| 75 | (structure with $NH_2$, $SO_3H$, $NH$—phenyl($SO_3H$)—$CH_2$—N($CH_3$)—H) | Blue. |

EXAMPLE 76

An amount of 57.6 g. of copper phthalocyaninetetrasulphonic acid chloride is suspended in 500 ml. of water and 300 g. of ice; the suspension is then stirred with 15 g. of m-aminoacetanilide, and adjusted to a pH-value of 7 by the addition of aqueous ammonia solution. The temperature is then allowed to slowly rise to 40–50°, whereby the pH-value of the suspension is maintained constantly at 7.0–7.5 by the dropwise addition of ammonia solution. As soon as condensation is finished, i.e. with no further primary amine being detectable, 270 ml. of 30% hydrochloric acid are added, and the mixture is heated for 3 hours to 85–90°, whereby the acetylamino group is saponified. The dyestuff is then isolated by filtration; it is again suspended in 1000 parts of water at 0–5°, and the pH-value of the suspension adjusted with dilute sodium hydroxide solution to 8.0. To this suspension are added 21 g. of cyanuric chloride. Condensation is performed at 0–5°, whilst the suspension is well stirred, and the hydrochloric acid being liberated is neutralised by dilute sodium carbonate solution being added dropwise. As soon as condensation is finished, the temperature is raised to 40–55°, and a solution of 9.5 g. of disodium cyanamide in 50 ml. of water is added dropwise within 2 hours. After completed reaction, the new dyestuff of the following constitution is salted out, filtered off, and dried at 50-60° in vacuo. It corresponds to the following formula:

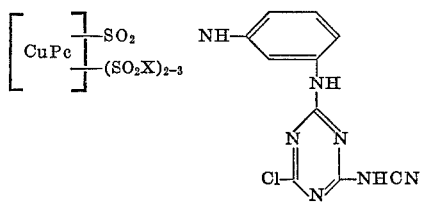

wherein

Pc represents the phthalocyanine structure, and
X represents in some cases —$NH_2$, and in some cases —ONa or —$ONH_4$.

The dyestuff dyes cellulose or polyamide fibres in pure turquoise blue shades having fastness to wet processing.

If, instead of the condensation product from 57.6 g. of copper phthalocyaninetetrasulphonic acid chloride and 15 g. of m-aminoacetanilide (saponified), the copper phthalocyanine dyestuffs listed in the following Table 3, column II, are used, the procedure being otherwise analogous to that described in Example 76, then reactive dyestuffs are obtained having similarly valuable properties, whereby the shade of the cellulose dyeing produced therewith is given in column III of the same table.

EXAMPLE 79

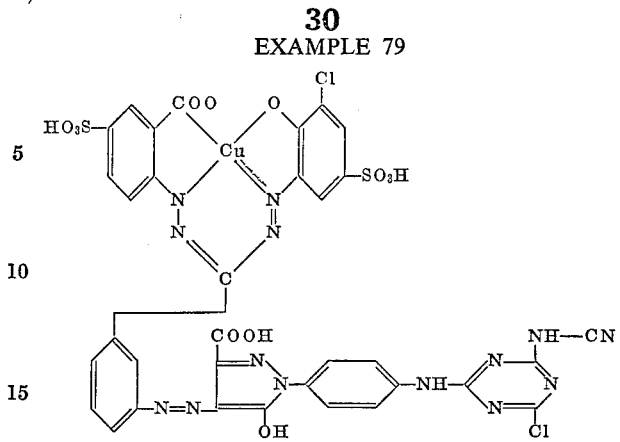

An amount of 86.1 g. of the aminoformazanazo dyestuff of the following formula

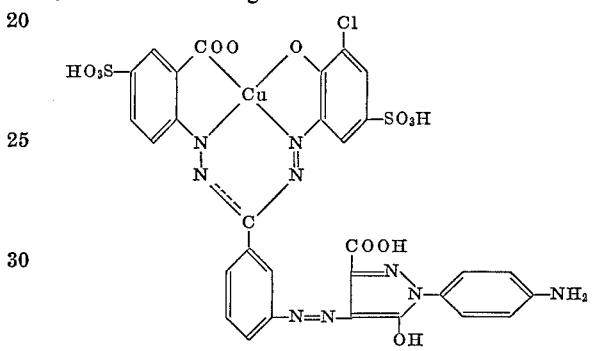

is dissolved in 1000 ml. of water; to this solution are then added 20 g. of 2,4-dichloro-6-cyanamido-1,3,5-triazine, and the whole is stirred at 40-50° until condensation is completed. During the reaction, the pH-value is maintained at 6-7 by the dropwise addition of sodium carbonate solution. As soon as no further starting dyestuff is detectable, the reactive dyestuff of the above formula is precipitated by the addition of potassium chloride, filtered off under suction, washed with potassium chloride solution, and dried in vacuo.

The dyestuff is in the form of an olive-coloured powder which dissolves in water to give an olive colour.

If, instead of the 86.1 g. of the aminoformazanazo dyestuff, equivalent amounts are used of the formazan dyestuffs or formazanazo dyestuffs given in Table 4, column II, the procedure being otherwise as described in Example 79, then reactive formazan or formazanazo dyestuffs having similarly valuable properties are obtained. The shades of the dyeings on cotton are listed in column III of the same table.

TABLE 3

| I | II | III |
|---|---|---|
| Example number | Copper phthalocyanine dyestuff | Shade on cellulose fibres |
| 77 | [CuPc—($SO_3H$)$_3$, —$SO_2$·NH·$CH_2$·$CH_2$·$NH_2$] | Turquoise blue. |
| 78 | [CuPc—($SO_2$·$NH_2$)$_3$, —$SO_2$·NH—C$_6$H$_3$($NH_2$)—$SO_3H$] | Do. |

TABLE 4

| I | II | III |
|---|---|---|
| Example Number | Formazan compound or formazanazo compound | Shade on cellulose fibres |
| 80 | [Cu-formazan structure with $SO_3H$, $NH_2$, $SO_3H$, $SO_3H$, $SO_2H$ substituents] | Blue. |

TABLE 4—Continued

| I<br>Example Number | II<br>Formazan compound or formazanao compound | III<br>Shade on cellulose fibres |
|---|---|---|
| 81 | [structure: Cu complex formazan with HO₃S, COO, O, NH₂, SO₃H, SO₃H substituents] | Blue. |
| 82 | [structure: Cu complex formazan with HO₃S, COO, O, SO₃H, SO₃H, –N=N–C₆H₄–NH₂ substituents] | Do. |
| 82a | [structure: Cu complex formazan with NH₂, HO₃S, O, SO₃H, phenyl substituents] | Do. |

EXAMPLE 83

Cotton or staple fibre is impregnated at 20–25° with a solution containing 20 g. of the dyestuff described in Example 1, 50 g. of sodium sulphate and 20 g. of calcined sodium carbonate; it is then squeezed out to give a weight increase of 80 to 100% rolled up, and stored for 4–24 hours at room temperature. After rinsing and soaping, a pure red deying is obtained which possesses an outstanding fastness to washing, and a very good fastness to light.

EXAMPLE 84

Cotton is padded at 20° with a solution containing 2% of the dyestuff described in Example 1, and then dried. After drying, the material is padded with a solution containing 1% of sodium hydroxide and 30% of sodium chloride; it is then steamed for 30 seconds at 100–103°. After rinsing, and soaping with boiling, a very pure red dyeing is obtained having fastness to boiling.

EXAMPLE 85

Cotton is introduced at 20–25° into a dye bath (ratio of goods to liquor=1:40) containing, relative to the cotton, 2% of the dyestuff described in Example 1. Within 30 minutes, sodium sulphate is added in portions until the bath contains 50 g. thereof per litre. In the course of a further hour, 10 g./litre of calcined soda are added, and the temperature simultaneously raised to 35°. After completed dyeing, the material is rinsed, and soaped whilst being boiled. An even red dyeing is obtained having very good fastness to wet processing.

EXAMPLE 86

An amount of 100 g. of polyamide fibres is heated to boiling for one hour in a dye bath containing in 3000 ml. of water 2-g. of the dyestuff obtained according to Example 1, and 2 ml. of formic acid. After the material has been rinsed, a bluish red dyeing is obtained having an excellent fastness to wet processing and to light.

EXAMPLE 87

An amount of 2 g. of the dyestuff obtained according to Example 1 is dissolved in 5000 ml. of water at 40°; to this solution are then added 0.5 g. of a condensation product of ethylene oxide with stearylamine and 6 ml. of 30% acetic acid. 100 g. of wool are introduced into the thus obtained dye bath, the bath is heated within 30 minutes to boiling, and the material dyed for one hour at this temperature. After rinsing a bluish red dyeing is obtained having good fastness to light, rubbing and to washing.

EXAMPLE 88

A cotton fabric is padded at 20-25° with a solution containing per litre of water 20 g. of the reactive dyestuff according to Example 1; the material is squeezed out to a liquid absorption of 80%, and dried for 1 minute at 100°. The thus pre-treated material is then padded with a solution containing per litre of water 250 g. of sodium chloride and 15 g. of 30% aqueous sodium hydroxide solution; it is squeezed out to give a liquid absorption of 80%, and afterwards exposed to the air for 10-30 seconds at 20-25°. The material is thereupon soaped for 10 minutes in a bath at 95-98° containing 2 g. of soap per litre; and is subsequently rinsed and dried. A red cotton dyeing is obtained.

EXAMPLE 89

A printing plaste is produced by stirring together 330 ml. of water, 200 g. of urea, 10 g. of sodium salt of m-nitrobenzenesulphonic acid, 395 g. of 5% sodium alginate thickening and 25 g. of sodium bicarbonate, at room temperature (20° C.), to form a stock thickening; an amount of 40 g. of the reactive dyestuff according to Example 1 is then stirred into this thickening.

If a cotton fabric is printed with this printing paste, and the dried fabric steamed for 60 seconds at 101-103°, soaped, rinsed and dried, then a red printing is obtained.

We claim:
1. A reactive dyestuff of the formula

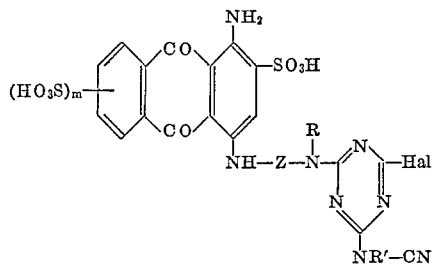

in which Z is a divalent bridging member of the benzene or cyclohexane series, R and R' are, independently of each other, hydrogen or low alkyl, Hal is fluorine, chlorine or bromine, and $m$ is 0, 1 or 2.

2. A reactive dyestuff according to claim 1, wherein R and R' each represents hydrogen and Hal represents chlorine.

References Cited

UNITED STATES PATENTS 3,399,194  8/1968  Mangini et al. _____ 260—249

JOHN M. FORD, Primary Examiner

U.S. Cl. X.R.

260—153, 314.5; 8—1 E, 41